(12) United States Patent
Hoenicka et al.

(10) Patent No.: US 8,248,598 B2
(45) Date of Patent: Aug. 21, 2012

(54) METHOD FOR COMPENSATING FOR TEMPERATURE RELATED MEASUREMENT ERRORS IN A CONFOCAL CHROMATIC MEASURING DISTANCE SENSOR

(75) Inventors: Reinhold Hoenicka, Ortenburg (DE); Alexander Fink, Passau (DE)

(73) Assignee: Micro-epsilon Messtechnik GmbH & Co. KG, Ortenburg (DE)

( * ) Notice: Subject to any disclaimer, the term of this patent is extended or adjusted under 35 U.S.C. 154(b) by 393 days.

(21) Appl. No.: 12/598,342

(22) PCT Filed: May 21, 2008

(86) PCT No.: PCT/DE2008/000912
§ 371 (c)(1),
(2), (4) Date: Oct. 30, 2009

(87) PCT Pub. No.: WO2008/141640
PCT Pub. Date: Nov. 27, 2008

(65) Prior Publication Data
US 2010/0128264 A1    May 27, 2010

(30) Foreign Application Priority Data

May 21, 2007  (DE) .......................... 10 2007 023 794
May 15, 2008  (DE) .......................... 10 2008 023 665

(51) Int. Cl.
*G01J 3/00* (2006.01)
(52) U.S. Cl. ........................................... 356/300
(58) Field of Classification Search .................. 356/300, 356/326
See application file for complete search history.

(56) References Cited

U.S. PATENT DOCUMENTS

| 4,919,519 A | | 4/1990 | Fantozzi et al. |
| 5,206,701 A | * | 4/1993 | Taylor et al. ................... 356/328 |
| 5,592,294 A | * | 1/1997 | Ota et al. ....................... 356/402 |
| 5,740,079 A | * | 4/1998 | Shigemori et al. ............. 356/402 |
| 5,785,651 A | | 7/1998 | Kuhn et al. |

(Continued)

FOREIGN PATENT DOCUMENTS

DE    198 27 140 A    12/1999

(Continued)

OTHER PUBLICATIONS

International Search Report for International Application No. PCT/DE2008/000912.

(Continued)

*Primary Examiner* — Kara E Geisel
(74) *Attorney, Agent, or Firm* — Alston & Bird LLP

(57) ABSTRACT

According to the invention, a method for compensating for temperature related measurement errors in an optical arrangement, comprising at least one lens is designed with a view to an economical and reliable as possible compensation for temperature related measurement errors without significant increased production expense, wherein a multicolored beam is passed through the optical arrangement, which is focused at points at varying distances from the lens as a result of the chromatic aberration of the lens, at least a part of the spectrum of the light beam being at least partly reflected within the optical arrangement and directed to a detector device by means of which a determination of a spectrum is carried out, the temperature of the arrangement is determined from the spectrum recorded by the detection device and a compensation for temperature related measurement errors is carried out based on the temperature determined thus. A corresponding optical arrangement in disclosed.

13 Claims, 3 Drawing Sheets

U.S. PATENT DOCUMENTS

| | | | | |
|---|---|---|---|---|
| 5,991,023 | A * | 11/1999 | Morawski et al. | 356/326 |
| 6,029,115 | A * | 2/2000 | Tracy et al. | 356/326 |
| 6,606,156 | B1 * | 8/2003 | Ehbets et al. | 356/328 |
| 6,848,825 | B1 | 2/2005 | Simon et al. | |
| 6,917,421 | B1 | 7/2005 | Wihl et al. | |
| 7,088,441 | B2 * | 8/2006 | Nahum et al. | 356/416 |
| 2002/0126280 | A1 * | 9/2002 | Mikes | 356/328 |
| 2005/0088649 | A1 * | 4/2005 | Katsunuma | 356/328 |
| 2006/0001881 | A1 * | 1/2006 | Maier et al. | 356/416 |
| 2006/0012772 | A1 | 1/2006 | Sesko | |
| 2007/0086000 | A1 | 4/2007 | Messerschmidt et al. | |
| 2007/0097529 | A1 | 5/2007 | Weber et al. | |
| 2008/0130013 | A1 | 6/2008 | Stautmeister et al. | |

FOREIGN PATENT DOCUMENTS

| | | |
|---|---|---|
| DE | 102 61 973 A1 | 1/2004 |
| DE | 10 2004 049 541 A1 | 4/2006 |
| JP | 58 00 7109 | 1/1983 |
| WO | WO 2007/023052 | 3/2007 |

OTHER PUBLICATIONS

International Preliminary Report on Patentability and Written Opinion for Appl. No. PCT/DE2008/000912 dated Dec. 7, 2009.

* cited by examiner

METHOD FOR COMPENSATING FOR TEMPERATURE RELATED MEASUREMENT ERRORS IN A CONFOCAL CHROMATIC MEASURING DISTANCE SENSOR

BACKGROUND OF THE INVENTION

1. Field of the Invention

The invention concerns a method to compensate measuring errors due to temperature of an optical arrangement having at least one lens and a corresponding optical arrangement.

2. Description of Related Art

In numerous areas of industry such as the semiconductor and automobile industry, optical arrangements are widespread. They are, for example, used for contactless determination of positions or measurements and must work in temperature ranges from −30° C. to +70° C. while doing so in a reliable and precise manner. Such temperature changes, however, result in dimensional changes of the optical and mechanical components due to the temperature coefficient of expansion specific to a material. This considerably reduces the measuring accuracy. An aluminum bracket with a length of 10 mm, for example, expands with a temperature change from −20 to +40° C. by 14 μm. In order to compensate this temperature effect, various fixtures have already been proposed.

U.S. Pat. No. 4,919,519 discloses a system having a lens arrangement that is shifted in its position depending on the temperature. For this, a liquid is contained in a chamber, which moves the lens arrangement along the longitudinal optical axis in the event of expansion due to temperature. As a result, the optical arrangement is influenced in a focused manner depending on the temperature.

Another arrangement also drawing on the expansion of a liquid is shown in DE 10 2006 046 416 A1. There, an optical element is driven via a piston-cylinder unit relative to a casing depending on the temperature. In the process, a liquid with defined temperature coefficients is contained in the piston-cylinder unit. By means of suitable adjustment of the individual elements in the arrangement, thermal influences can be compensated to a considerable extent.

Another approach is demonstrated in DE 102 61 973 A1. There, a tube-shaped bracket for a lens is inserted in an intermediate bracket. The bracket and the intermediate bracket are selected in terms of their dimensioning and in the temperature coefficients of the materials such that the expansions of the bracket and intermediate bracket compensate one another in the event of a temperature change and the lens is kept in a constant position.

With the fixtures disclosed in the publications JP 58 00 7109 A and WO 2007/023052 A1, corrective materials with a defined temperature expansion coefficient are arranged between a detector element and the casing surrounding the arrangement, which subsequently adjust the position of the detector in the event of changes in temperature. As a result, the distance between the optics and detector can be kept constant with suitable dimensioning.

With the fixtures known on the basis of the state-of-the-art, the fact that the optical arrangements and their components must be adjusted with respect to one another to a considerable extent is problematic. Even if only individual components are to be replaced or if, as a result of production tolerances, fluctuations in the temperature coefficients occur, solely an insufficient compensation of the errors resulting from a change in temperature occurs. Such fixtures are not lastly associated with considerable costs as a result and exhibit a corresponding susceptibility to errors.

Furthermore, with the construction of the fixtures, one must often resort to special and therefore expensive materials in order to adjust the individual components with one another in a suitable manner. Furthermore, the additional components for the compensation of a change in temperature result in the enlargement of the fixture designs. In addition, such fixtures cannot be implemented or only to a very limited extent with optical arrangement, which exhibit gradient-index lenses. Gradient-index lenses exhibit a non-linear change in the refractive index of the lens in addition to the geometrical change in dimensions.

Therefore, it is the task of this invention to achieve and further embody a method and an optical arrangement of the type initially stated and to configure it further such that affordable and reliable compensation of measuring errors resulting from a change in temperature without any considerable increase in resources required for the construction can be achieved.

SUMMARY OF VARIOUS EMBODIMENTS

According to the present invention, this task is solved by the features of the various method embodiments described herein. According to which, the method in question is further developed such that a multicolor ray of light passes through the optical arrangement that is, as the result of chromatic aberration of the lens, focused on points located at various distances from the lens such that part of the spectrum of the ray of light reflects at least in part within the optical arrangement and is directed to a detection device, by means of which the determination of a spectrum is performed such that the temperature of the arrangement can be identified on the basis of the spectrum determined by the detection device and that, by means of the temperature determined in this way, a compensation of measuring errors resulting from a change in temperature is performed.

With respect to the optical arrangement, the task at hand is solved by the features of the various optical arrangement embodiments described herein. According to which, the optical arrangement in question is characterized in that the lens as the result of chromatic aberration focuses a multicolor ray of light on one of the points located at various distances from the lens such that an optical means is arranged within the optical arrangement such that part of the spectrum of the multicolor ray of light is at least reflected in part on the boundary surface of the optical means. The reflected part of the spectrum can be directed to a detection device for determining the spectrum such that an evaluation unit is connected with the detection device, which identifies the temperature of the arrangement on the basis of the spectrum determined by the detection device and performs a compensation of the measuring errors resulting from a change in temperature.

It is first recognized in an inventive manner that one can refrain to a considerable extent from construction measures and from coordinating geometries and temperature expansion coefficients. This can be avoided with this invention such that a parameter depending on the temperature is determined within the optical arrangement, which can be applied for the compensation of measuring errors resulting from a change in temperature.

For this, a multicolor ray of light is coupled with the optical arrangement, which is focused by at least one lens from the optical arrangement on points located at various distances from the lens as the result of chromatic aberration. Chromatic aberration describes a property of projection optics, according to which a multicolor ray of light is refracted by the lens at varying degrees depending on the wavelength. As a result, a series of focal points that lie in front of the lens are produced along its optical axis. This separation into multiple focal points can be applied for measuring distances. A fixture suitable for this is disclosed in WO 2006/122519 A1. With this fixture, a spectrally separated multicolor ray of light is directed to a measuring object by means of a chromatic aberration of a lens and reflected by it. The reflected ray of light reaches, via optical conductors and an aperture, a spectrometer, which performs the determination of a spectrum. By means of specially designing the fixture, the spectral components of the reflected multicolor ray of light essentially reach the spectrometer, which have been focused as precisely as possible on the surface of the measuring object. As a result, a distance to the measuring object can be determined.

According to the present invention, this effect can be used not just for measuring distances. Rather, chromatic aberration can also be used to determine a parameter that represents a measurement for measuring errors of the optical arrangement resulting from a change in temperature. For this, reflections within the optical arrangement are used, which customarily are generated along the boundary surface of optical means anyway. In this way, part of the spectrum of the multicolor ray of light can be reflected within the optical arrangement and directed to a detection device. In the detection device, the spectrum of the reflected ray of light is determined, which shifts depending on the temperature of the arrangement. As such, the temperature of the arrangement can be determined in reverse order on the basis of a spectrum determined by the detection device. With this information, compensation of measuring errors resulting from a change in temperature can in turn be performed.

By means of the special design of the arrangement, no separate temperature sensor is necessary, as only the measurements within the sensor, that is the measurements within the optical arrangement, are performed. For this, an otherwise unwanted parasitic effect of an optical arrangement is used without impacting the actual operation of the optical arrangement in the process.

For an allocation of a spectrum determined by the detection device to a temperature of the arrangement, various methods can be employed. Look-up tables could be used as a relative resource-efficient possibility. For this, an allocation between a spectral component and the respective corresponding temperature of the arrangement is stored in the look-up table. With the allocation of a respective temperature of the arrangement, the spectral components from the spectrum determined by the detection device could be extracted, which generally only consist of spectral lines or a narrow spectral range. The corresponding temperature could then be read from the look-up table.

Alternatively, a functional link between the spectrum and the temperature of the arrangement could be filed. This allocation requires much less storage space and is normally more precise as no restriction exists with respect to the number of the basic values. However, a greater computing capacity is necessary in order to determine the temperature on the basis of the functional association, which is, however, likely not problematic in many applications. The determination of the temperature would occur with this method in using a look-up table. Following the extraction of the spectral components, they would be functionally associated and calculated accordingly. Here, the functional association can be solved by means of a microcomputer or the like.

After the temperature of the arrangement has been determined, this is used to compensate measuring errors resulting from a change in temperature. Preferably, this occurs by means of a correcting member that represents a dependency of the temperature and can be added to the measurement determined by the optical arrangement. Here, the measurement is increased or decreased depending on the leading sign of the correcting component, whereby compensation of the measurement errors of the optical arrangement occurs. Compensation could, however, also be performed by means of multiplication with another correcting member or by means of multipliers with another correcting member or using another look-up table. With the additional look-up table, reference values, which have been acquired on the basis of the calibration measurements, could be assigned to a measurement depending on the temperature. Alternatively, the compensation could also occur by means of manipulating the optical arrangement. As such, it is in principle plausible that shifting occurs with lens actuators, detectors or other optical means or influencing the property occurs with optical means. Finally, a multiplicity of methods known from the state-of-the-art for compensating measuring errors resulting from a change in temperature exists.

For the determination of the look-up tables, the functional association or the correcting members, calibration measurements could be performed. For this, the optical arrangement could be set up in a measuring situation and brought to the defined temperatures in a climate oven. Here, the entire temperature range, in which the optical allocation is to be implemented, could be run through. In addition, the entire measuring range of the optical arrangement could be varied such that depending on the temperature, corresponding real parameters are known. On the basis of these calibration measurements, the spectral lines belonging to a temperature and the respective internal reflections result. Furthermore, information regarding the measuring errors for a temperature can be acquired, and corresponding correcting members can be calculated on their basis. Finally, these values can be used to create a look-up table or to find a functional association.

Preferably, in addition to the compensation of measuring errors resulting from a change in temperature, compensation of further errors could also be performed. In this way, additional errors occur with optical arrangements that have gradient-index lenses, which are particularly caused by the aging effects of the lenses. In general, these errors, though relatively marginal, reduce the measuring accuracy of the optical arrangement. By means of the simultaneous use of the optical arrangement to measure a measurement and to measure the temperature, these errors can, however, be easily compensated. By means of the drift effect, measurements of the temperature are in this case also influenced in addition to the measurement parameters. As a result, a drift also affects the measurement accuracy of the temperature. Preferably, both errors cancel each other out to a considerable extent.

In a particularly advantageous configuration of the invention, the allocation comprises a confocal chromatically measuring distance sensor as described in WO 2006/122519 A1 that was already mentioned. Not only the distance to the measuring object, but at the same time also the temperature of the sensor can be determined. The detection device of the sensor can be used to achieve both goals. In the spectrum determined by the detection device, at least two peaks will exist: one peak brought about by reflections on the measuring object and one significantly smaller caused by internal sensor reflections. The latter is commonly positioned by means of the skilled dimensioning of the sensor such that it is located at the bottom end (in the red range) or at the upper end (in the blue range) of the spectrum. Both peaks are influenced by temperature-dependant errors and contain both distance and temperature information. The distance information results in that the sensor itself is subject to length expansion. As, however, the geometry of the sensor and as such, the internal-sensor distances, are known, the temperature-dependant errors of the peak caused by the internal-sensor reflection can be easily determined. As a result, the error of the distance can in turn be determined as the distance information is subject to the same influences of error. Finally, the internal-sensor errors do not play any role and are also taken into account overall in the compensation.

In the optical arrangement, a lens, preferably a gradient-index lens, is used. Gradient-index lenses have a relatively arbitrary geometric structure and are characterized by the progression of the refraction index perpendicular to the expansion direction of the ray of light. In most cases, gradient-index lenses are, however, built cylindrically; the rays of light enter and exit along the base and top surface area of the cylinder. A ray of light passing through a gradient-index lens describes as a result part of a sinusoidal curve within the lens. The longer a gradient-index lens is, the greater the components of a sinusoidal curve are described in the lens. Here, the chromatic aberration increases by means of the extension of the gradient-index lens, whereby a separation of the spectral components can be increased as a result. However, as the gradient-index lens increases, the temperature errors also increase. This can, however, be accepted within certain limits as such errors can be measured and compensated by means of the inventive method and the inventive fixture in a very simple manner.

Preferably, the light from a white light source is used for the multicolor ray of light in question. As such, the analysis of the results of measurement is considerably simplified. However, in principle, other light sources could also be used. Here, however, it makes sense if spectral components are essentially contained in the light source continually. This ensures that a continual measurement range can be covered for the most part.

The reflection used to determinate the temperature of the arrangement within the optical arrangement is performed on an optical means. These optical means can be formed in a variety of ways. As such, an ancillary lens, for example, which is arranged downstream from the lens producing the aberration, can form the optical means. This ancillary lens could be held by means of a bracket that features a very minimal temperature expansion coefficient by means of a suitable selection of material (e.g. ceramics or invar). As a result, the position of the analysis lens would only change to a very marginal degree in the event of fluctuations in temperature.

However, the lens itself that produces the chromatic aberration could form the optical means. In using a gradient-index lens, the boundary surface could, for example, be formed by means of the front face of the lens pointing towards the measuring object.

In any case, a reflection is produced along the boundary surface of the optical means, with which part of the spectrum of the multicolor ray of light is reflected. Here, the complete intensity of a spectral component is normally not reflected along the boundary surface. In part, they also pass through the boundary surface such that the component of the spectrum is generally reflected only in part.

Should the intensity of the reflected light not be sufficient, the boundary surface of the optical means could also be coated with a suitable layer. As such, the intensity of the reflected ray of light could be increased. As it is likely often known which spectral components the reflected rays of light exhibit, the coating could be adjusted to these wavelengths accordingly.

Preferably, the boundary surface of the optical means, which is used to determine the temperature in the optical original, is allocated in the area, in which the multicolor ray of light has been spectrally separated, that is downstream from the lens producing the chromatic aberration. Here, there are, however, various points at which the boundary surface can be allocated. As such, the measuring range for the arrangement can, on one hand, be arranged such that part of the measuring range lies within the optical arrangement. As a result, though part of the measuring range cannot be used for actual measurement, this unusable range can be selected so small that the temperature-dependent changes just manage to be rendered. In this way, the unusable range is kept to a minimum. In return, the arrangement offers a temperature measurement without, however, an additional requirement for sensors.

Alternatively, the boundary surface could also be located in an intermediate focal range of the arrangement. In this way, a primary lens from the optical arrangement can be arranged such that it produces the chromatic aberration and focuses the occurring multicolor ray of light on a series of focal points. A second lens allocated downstream could be used to create the light emitted. If this second lens is behind the focal point area of the first lens, a boundary area can be allocated in this intermediate focal area, which produces a reflection used to determine the temperature. As a result, the spectrum detected by the detection device loses its definition as the part of the spectrum used for determining the temperature no longer distinctly differs from that used for the measuring. However, the intensity of the ray of light produced by the reflections within the arrangement is significantly less than the ray of light produced by the external reflection. For this reason, this lack of definition can be solved in a relatively simple manner.

BRIEF DESCRIPTION OF THE SEVERAL VIEWS OF THE DRAWINGS

At this point, there are various possibilities for designing and further developing the method of this invention in an advantageous manner. For this, reference is, on one hand, to be made to the various embodiments described herein, and on the other hand, to the following explanation of a preferred sample configuration of the invention with the figure. In conjunction with the explanation of the preferred sample configuration of the invention with the figure, preferred configurations and further embodiments of the method are generally explained.

In the figure, the following are shown.

DETAILED DESCRIPTION

Figure 1:
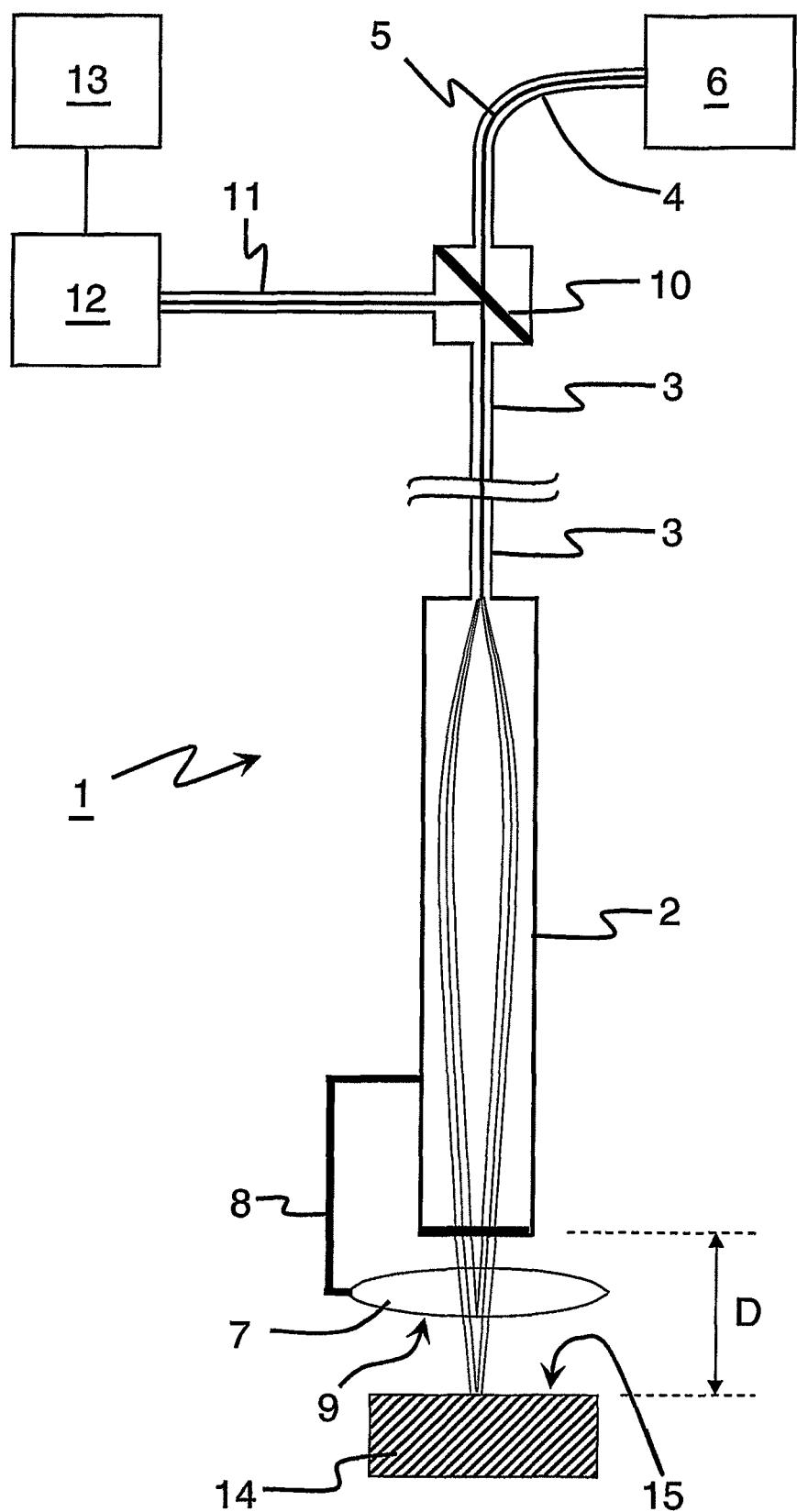
FIG. 1 in a schematic representation, a confocal chromatically measuring sensor with an ancillary lens while using the inventive compensation of measuring errors resulting from a change in temperature, FIG. 2 a diagram with an exemplary spectrum measured by the sensor as per FIG. 1 and FIG. 3 in a schematic representation, the front part of a confocal chromatically measuring sensor without an ancillary lens while using inventive compensation of measuring errors resulting from a change in temperature with the corresponding spectrum.

FIG. 1 shows an optical arrangement 1, which contains a gradient-index lens 2. A multicolor ray of light 5 is coupled in the gradient-index lens 2 via the fiber optics 3, 4, which is generated by a white light source 6. The gradient-index lens 2 consists of a quartz glass rod, which is provided with metal ions (for example silver ions) such that a refractive index profile is created perpendicular to the optical axis of the lens. Within the gradient-index lens 2, the multicolor ray of light 5 is directed to varying degrees depending on the wavelength of the spectral components, whereupon in the area upstream from the gradient-index lens 2, a series of focal points are produced, of which three are shown in the FIG. to provide an example. An ancillary lens 7 is allocated upstream from the gradient-index lens, which is held by a bracket 8. The ancillary lens 7 serves as optical means and provides a boundary surface 9. Part of the spectrum of the multicolor ray of light is reflected across the boundary surface 9, the gradient-index lens 2 extends in the opposite direction (in FIG. 1 upwards) and meets a semipermeable mirror 10, which forwards the rays of light reflected within the optical arrangement or the rays of light reflected back into the optical arrangement from outside via a fiber optic 11 of a detection device 12. The detection device 12 is formed by means of a spectrometer, which separates the rays of light entering it corresponding to their wavelengths and which measures their respective intensity. The detection device 12 is an evaluation unit 13 provided in order to analyze the spectrum determined by the detection device.

The multicolor ray of light 5 passing through the gradient-index lens 2 is not reflected by the boundary surface 9 to a large extent, rather, it leaves the optical arrangement by means of the boundary surface 9 of the ancillary lens 7. If a measuring object 14 is located within the measuring range of the optical arrangement, the light reflected by the measuring object 14 is also directed via the ancillary lens 7, the gradient-index lens 2, the fiber optic 3, the semipermeable mirror 10 and the fiber optic 11 to the detection device 12. Here, though in principle all rays of light occurring are reflected by the measuring object, only the spectral components, which are focused on the surface 15 of the measuring object 14, meet the optical requirements for being able to enter the fiber optic 3 from the gradient-index lens 2. As a result, a relative sharp peak is produced within the spectrum, whose analysis offers a possibility to determine the distance D of the measuring objective 14 from the optical arrangement 1.

Figure 2:
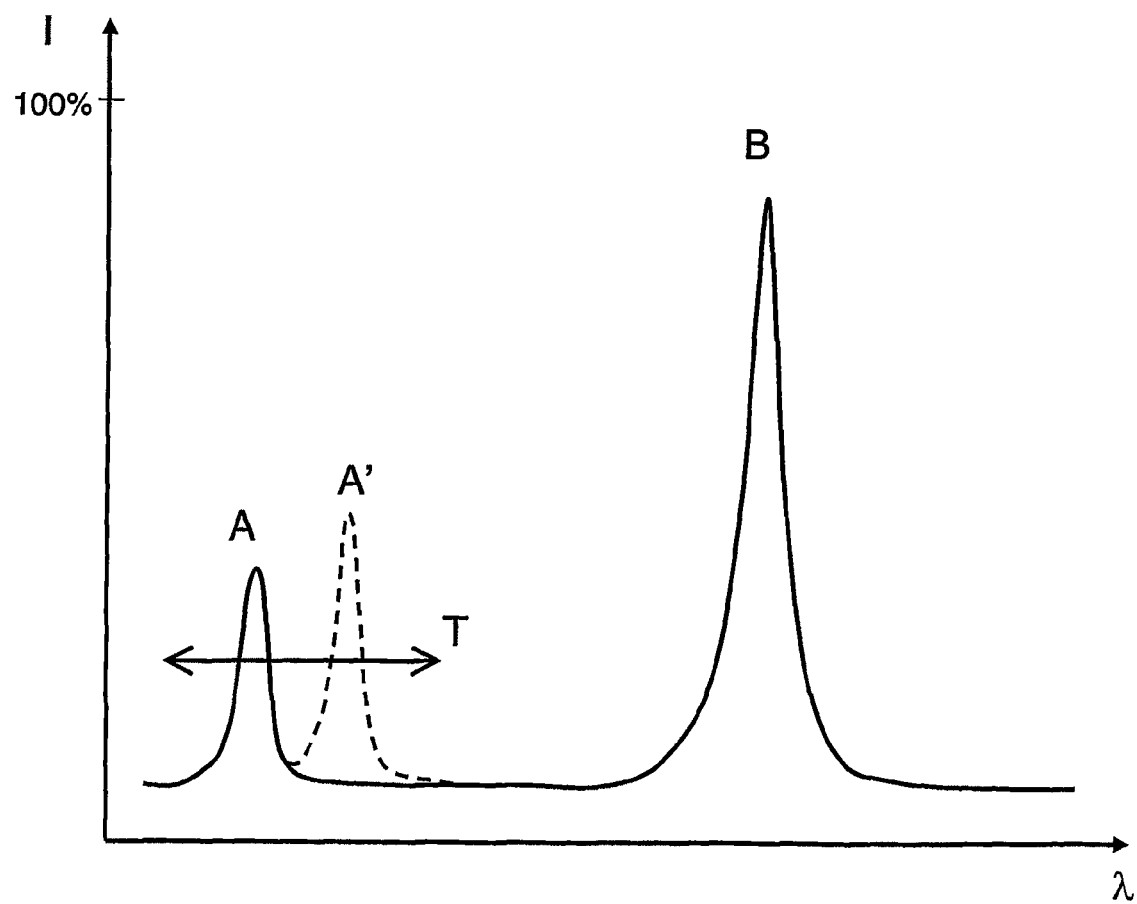

A spectrum detected by the detection device 12 is provided in FIG. 2 as an example. There, the intensity I of the spectral components above the wavelength $\lambda$ is applied. In the short-wave range, a relatively low peak A can be recognized; a higher peak B exists with a greater wavelength. The positions of the peak result from the special configuration of the arrangement. They could, with another configuration of the arrangement, also be found in each instance at another position.

Both peaks are influenced by errors resulting from a change in temperature and contain both distance information and temperature information. While, however, the distance to the measuring object is unknown and for this reason, should be measured, the position of the ancillary lens 7 changes solely depending on the temperature. This change can, on one hand, be reduced by means of selecting a suitable material for the bracket 8 (e.g. ceramic or invar). On the other hand, the change conducted does not play a role as these errors can also be compensated overall with the inventive method.

Peak A is therefore a component essentially dependent on the temperature of the optical arrangement, which results from the ray of light reflected along the boundary surface 9. The position of the peak A in the spectrum corresponds to the position of the boundary surface within the sensor and only changes with the temperature, where a temperature-dependant change is to be shown as a dashed line. The dashed peak A' shown results from the change of the temperature T of the optical arrangement.

On the other hand, peak B is essentially depending on the distances D of the measuring object 14 from the optical arrangement 1 and is associated with errors due to changes in temperature. However, with the information that can be acquired on the basis of peak A, which do not depend on the respective measuring situation, measuring errors resulting from a change in temperature can be corrected. For this, the spectral components of peak A are extracted by means of the evaluation unit 13 and while using a look-up table or a functional association, they are assigned to a temperature. Based on this temperature, a correcting member is determined that is added to a distance corresponding to peak B. As a result, a measurement free from errors that is independent from the ambient temperature can be issued by the evaluation unit 13. The look-up table, the functional association and the correcting member have been determined with calibration measurements.

Figure 3:
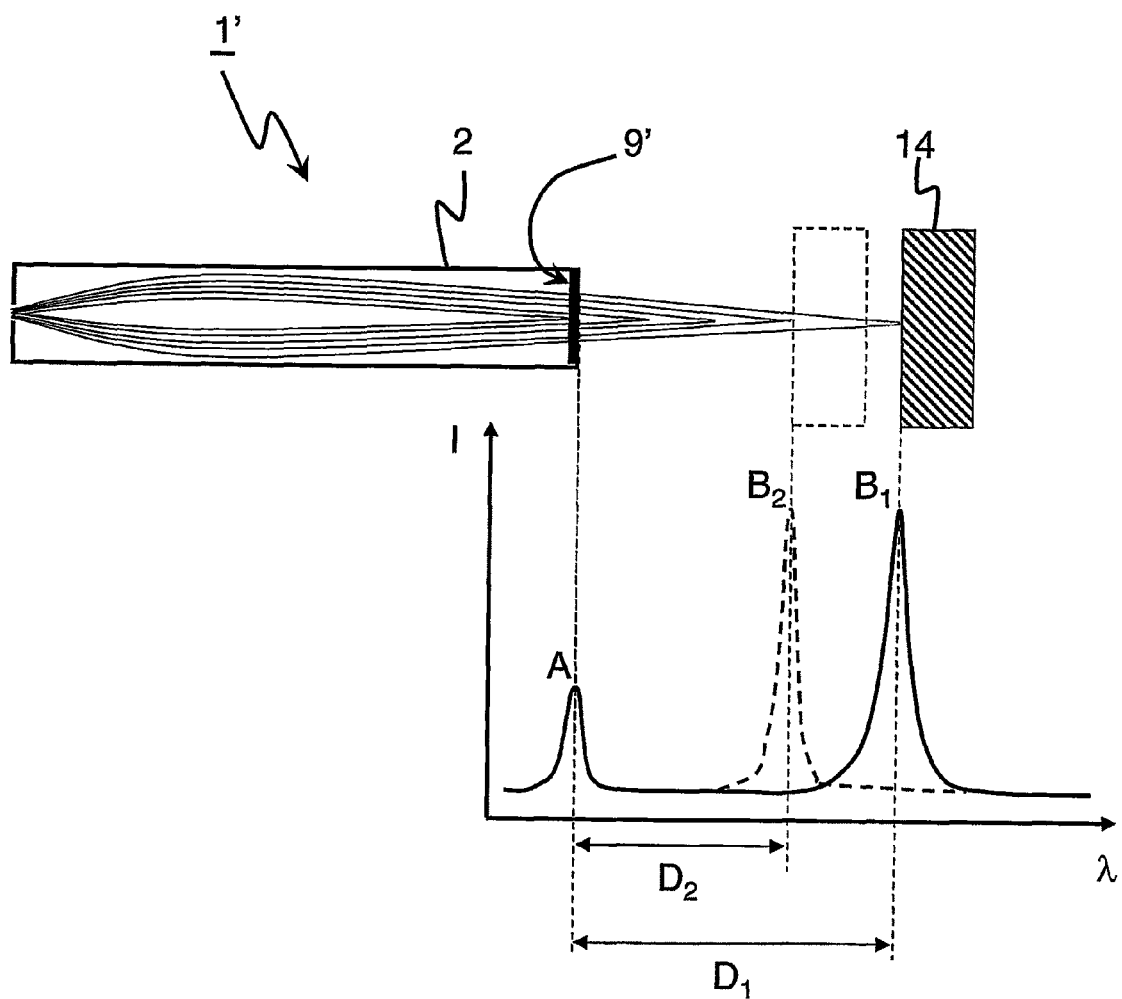

FIG. 3 shows the front part of the optical arrangement as per FIG. 1, where no ancillary lens is used. The representation of the light source 6, the detection device 12, the mirror 10 and the evaluation unit 13 were abstained from in FIG. 3 for the sake of clarity. In turn, a multicolor ray of light is coupled in the gradient-index lens 2, which is focused into various points locating upstream from the lens 2. A measuring object 14 reflects the light emitted by the optical arrangement 1' and reflects it back into the gradient-index lens 2. The analysis occurs corresponding to the explanations regarding 1. Here, the front surface of the gradient-index lens 2 serves as a boundary surface 9' of the optical means. The optical means is accordingly formed by means of the gradient-index lens 2.

The spectrum detected by the detection device 12 (not shown in FIG. 3) is shown in the bottom part of FIG. 3. There, the intensity I is in turn applied across the wavelength $\lambda$. The first peak A represents a parameter defining the temperature of the arrangement and only depends on the temperature of the arrangement. A second peak $B_1$ is caused by the measuring object. As a result, the distance $D_1$ of the measuring object 14 are determined by the optical arrangement 1'. In the event of the shifting of the measuring object 14, this peak shifts, which is drawn with dashes for the purpose of providing an example. In distance $D_2$ the shifted measuring object 14 is drawn with dashes, whereby a shifted peak $B_2$ is created. From the temperature acquired from Peak A, a correction of the measurement of the optical arrangement can in turn be determined via the evaluation unit 13.

The optical properties of gradient-index lenses do not change only in the event of changes in temperature, but they are also subject to the effects of aging. Such changes can also be determined via the reflection independent of the measuring object and can be calculated in the signal processing in the evaluation unit 13. As such, the general long-term drift behavior of the optical arrangement that is influenced by additional factors can be observed and compensated.

With respect to further advantageous embodiments of the inventive fixture, reference is made to the general part of the description and the various embodiments described herein in order to avoid repetitions.

Finally, let it be exclusively advised that the sample configurations of the inventive fixture provided here serve solely to explain the method embodiments, this is, however, not restricted to the sample configurations.

The invention claimed is:

1. A method for the compensation of measuring errors resulting from a change in temperature of an optical arrangement having at least one lens, said method comprising:

passing a multicolor ray of light through the optical arrangement, which is focused on points located at various distances from the lens as a result of chromatic aberration of the lens, such that part of the spectrum of the ray of light is at least partially reflected within the optical arrangement and is directed to a detection device, by means of which the determination of a spectrum is performed, such that on the basis of the spectrum determined by the detection device, the temperature of the arrangement is determined, and such that, by means of the temperature determined in this way, compensation of measuring errors resulting from a change in temperature is performed.

2. The method according to claim 1, wherein a look-up table or a functional association is used for allocating the spectrum determined by the detection device to a temperature of the arrangement.

3. The method according to claim 1, wherein an addition of a correcting member to a parameter determined by means of the optical arrangement is performed in order to compensate the measuring errors.

4. The method according to claim 2, wherein calibration measurements are performed in order to determine the look-up tables, the functional association, or the correcting members.

5. The method according to claim 1, wherein in addition to the measuring errors resulting from a change in temperature, the errors are compensated that are produced by means of effects of aging on the parts of the optical arrangement or other drift.

6. An optical arrangement, comprising:
at least one lens that focuses a multicolor ray of light coupled in the arrangement on points located at various distances from the lens as a result of chromatic aberration, such that within the optical arrangement an optical means is allocated such that part of the spectrum of the multicolor ray of light is at least partially reflected on a boundary surface of the optical means, whereupon the reflected part of the spectrum can be directed to a detection device in order to determine the spectrum, and such that an evaluation unit is connected with the detection device, which determines the temperature of the arrangement on the basis of the spectrum determined by the detection device and performs compensation of the measuring errors resulting from a change in temperature.

7. The optical arrangement according to claim 6, wherein the arrangement is a confocal chromatically measuring distance sensor.

8. The optical arrangement according to claim 6, wherein the lens comprises a gradient-index lens.

9. The optical arrangement according to claim 6, wherein the multicolor ray of light is a ray of white light.

10. The optical arrangement according to claim 6, wherein the optical means is formed by an ancillary lens allocated downstream from the lens or by the lens itself.

11. The optical arrangement according to claim 6, wherein in order to increase the reflection, the boundary surface of the optical means is coated.

12. The optical arrangement according to claim 6, wherein the measuring range of the arrangement has been defined such that a component of the measuring range lies within the arrangement.

13. The optical arrangement according to claim 6, wherein the optical means is allocated in an intermediate focal range.

\* \* \* \* \*